(12) United States Patent
Wu et al.

(10) Patent No.: US 8,762,231 B2
(45) Date of Patent: Jun. 24, 2014

(54) MERCHANDISE AND GEOGRAPHIC INFORMATION MATCHING SYSTEM, ASSOCIATE APPARATUS AND METHOD

(75) Inventors: Yu-Chieh Wu, Taiepei (TW); Chun-Ming Chen, Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 219 days.

(21) Appl. No.: 13/023,663

(22) Filed: Feb. 9, 2011

(65) Prior Publication Data

US 2012/0005046 A1 Jan. 5, 2012

(30) Foreign Application Priority Data

Jul. 1, 2010 (TW) ................................ 99121717 A

(51) Int. Cl.
*G06Q 30/00* (2012.01)
(52) U.S. Cl.
USPC .................... 705/26.9; 705/26.1; 705/27.1
(58) Field of Classification Search
USPC ...................................................... 705/26, 27
See application file for complete search history.

(56) References Cited

U.S. PATENT DOCUMENTS

| | | | | |
|---|---|---|---|---|
| 7,734,729 | B2 * | 6/2010 | Du et al. ........................ | 709/219 |
| 7,847,684 | B1 * | 12/2010 | Brady, Jr. ................... | 340/539.11 |
| 7,974,873 | B2 * | 7/2011 | Simmons et al. ............ | 705/7.29 |
| 8,554,632 | B2 * | 10/2013 | Jaramillo .................... | 705/26.1 |
| 2002/0059196 | A1 * | 5/2002 | I'Anson et al. ................... | 707/3 |
| 2007/0208631 | A1 * | 9/2007 | Jung et al. ....................... | 705/26 |
| 2008/0147730 | A1 * | 6/2008 | Lee et al. .................... | 707/104.1 |
| 2008/0249898 | A1 * | 10/2008 | Ratnakar ......................... | 705/27 |
| 2009/0006181 | A1 * | 1/2009 | Ghosh et al. .................... | 705/10 |
| 2011/0270697 | A1 * | 11/2011 | Sunkada ...................... | 705/26.1 |

FOREIGN PATENT DOCUMENTS

TW 200703160 A 1/2007

OTHER PUBLICATIONS

Chen et al.: "An Infrastructure to support location-aware services," IBM Journal of Research and Development 48.5/6 Sep.-Nov. 2004 PQDialog #220683618, 14pgs.*
"Mobile Commerce," OECD Digital Economy Papers, Jan. 16, 2007, PQDialog #189840482, 33pgs.*
Harter, Betsy: "Location, Location, Location," Global Telephony Oct. 2000, PQDialog #68913526, 6pgs.*
Stross, Randall: "Cellphone as Tracker: X Marks Your Doubts," New York Times, Nov. 19, 2006, PQDialog #433435104, 4pgs.*
TW Office Action dated Dec. 12, 2013, 15 pages, Abstract only.

* cited by examiner

*Primary Examiner* — Rob Pond
(74) *Attorney, Agent, or Firm* — Edell, Shapiro & Finnan, LLC

(57) ABSTRACT

Geographic merchandise matching system, associated apparatus and method are provided. In an embodiment, a handheld apparatus integrates user geographic location and a merchandise matching condition, and queries a merchandise service platform. An information matching module of the merchandise service platform accesses a merchandise database, a geography database and a comment database for sorting to form a matching result, and sends the matching result back to the handheld apparatus.

20 Claims, 5 Drawing Sheets

MERCHANDISE AND GEOGRAPHIC INFORMATION MATCHING SYSTEM, ASSOCIATE APPARATUS AND METHOD

CROSS REFERENCE TO RELATED PATENT APPLICATION

This patent application is based on Taiwan, R.O.C. patent application No. 099121717 filed on Jul. 1, 2010.

FIELD OF THE INVENTION

The present disclosure relates to a geographic merchandise matching system, associated apparatus and method thereof, and more particularly, to a handheld apparatus providing a merchandise matching service including geographic merchandise matching information, associated apparatus and method thereof according to its geographic location.

BACKGROUND OF THE INVENTION

Mobile phones, personal digital assistants, notebook computers, digital cameras and digital camcorders have become some of the most ubiquitous consumer electronics in recent years. Handheld devices, such as mobile phones, with positioning system have become increasingly prevalent and, as a result, the geographic location of a given handheld device may now be determined according to the wireless positioning signals sent from a positioning satellite. Providing value-added applications to handheld devices has become a focus of research and design for manufacturers.

SUMMARY OF THE INVENTION

To make effective use of the positioning system equipped in handheld devices, an embodiment of the present invention utilizes a handheld apparatus to integrate the geographic location of the device itself with a matching requirement about merchandise information to generate a query to a merchandise service platform; the merchandise service platform accesses a merchandise database, a geographic database and a review database for sorting those information to form a matching result that best satisfies the matching requirement, and sends the matching result back to the handheld device.

For example, when a user is searching for merchandise using the handheld apparatus of the present invention, the user may utilize the character recognition feature, the barcode recognition feature and/or the input module of the apparatus for input of the characters (for example, the name of the merchandise or related keywords) and/or the identification of the merchandise (e.g., merchandise's barcode) as a matching requirement for the merchandise to be searched; and the apparatus automatically integrates this matching requirement with the geographic location of the handheld apparatus as a matching inquiry input, and sends this matching inquiry input to the merchandise service platform via the apparatus utilizing its communication feature. The merchandise service platform searches/accesses the merchandise database, the geographic database and/or the rating database to start selection/matching/sorting according to the matching requirement and the geographic location, and then sends the matching result back to the handheld apparatus. In an embodiment, the merchandise service platform in the present disclosure may identify stores that sell the merchandise associated with the inquiry and selects and sorts stores according to the geographical location of the handheld apparatus and the geographic locations of the stores, so that the most nearby store(s) that sells the queried merchandise can be located based on the location of the user (within a fixed range). Thus, embodiments of the present invention may provide users an intuitive, user-friendly, and instant geographic merchandise matching service.

An object of embodiments of the present invention is to provide a geographic and merchandise information matching system structured on a handheld apparatus and a merchandise service platform. In an embodiment, the handheld apparatus comprises a positioning system, an image character recognition module, a barcode recognition module, an input module, a network connection module and a data reading module. The positioning module receives a wireless positioning signal and provides corresponding positioning information representing the geographical location of the handheld apparatus. The image character recognition module recognizes a character in an image, and the barcode recognition module recognizes a barcode in an image, the input module receives user's input and the data reading module integrates the characters, barcodes and/or the user inputs described above and provide those data as a matching condition.

In an embodiment, the merchandise service platform comprises an information matching module, an access interface, a geographic database, a merchandise database and a rating database. The information matching module receives the positioning information and the matching condition, accesses the geographic database, the merchandise database and the rating database via the access interface, and provides the matching results related to the merchandise information according to the positioning information and the matching condition given by the handheld apparatus, and the matching result is then sent back to the network connection module in the handheld apparatus.

The matching condition sent out from the handheld apparatus may comprise merchandise's barcode, name, the name of the store, or searching keywords . . . etc. At the merchandise service platform end, the merchandise database may comprise a plurality of related store information and a plurality of merchandise information; and each of the related store information may correspond to one store, wherein the information may comprise the store's name and related information (i.e. an identification number/or website) and/or the name of a supplying store, the barcode number, the merchandise's quantities, the selling price and other related information. The merchandise information may comprise the name of the merchandise, the barcode number, information relating to the manufacturer/producer (i.e. the identification number/or the website), and information relating to the merchandise (i.e. the manufacturing date, the expiration date, or suggested price . . . etc), the picture of the merchandise and/or other relating information. The geographic database may include a plurality of default geographical locations, where each of the geographic locations corresponds to one store and/or one manufacturer. The rating database records one or a plurality of rating scores and/or comments for each of the stores and/or manufacturers, and records information such as the date and source of each of the rating scores and comments (reviewer).

The information matching module in the merchandise service platform queries the merchandise database, the geographic database and the rating database according to the positioning information and the matching condition in the handheld apparatus to generate a matching result. This matching result comprises at least a matching data subset, wherein each matching data subset may comprise the name of the merchandise, network connection information, comment related information (i.e., the queried merchandise and/or rating score and comment of the store), the merchandise's barcode, pricing related information, styling related information, store related information, navigation path and/or the picture of the merchandise . . . etc. The information matching module may evaluate a corresponding matching level for each of the data subset, and may sort each of the data subsets in the matching result according to its matching level. For example, the information matching module may access the corresponding default geographic location of the store of each of the matching data subsets and compute the matching level by calculating the distance between the location of a handheld apparatus and the location of a store; and assigns a higher matching level to the store that is closer to the geographical location of the handheld apparatus so the corresponding matching data subset may be sorted closer to a top of a sorted list. Besides using the geographical distance, the matching level of the information matching module may also be computed by integrating the related information including the merchandise's selling price, the rating scores of the merchandise and/or the store, the matching condition of the merchandise and/or the store . . . etc.

Another object of the present disclosure is to provide a handheld apparatus comprising a positioning system, a data reading module, a network connection module and a matching access module. The positioning system provides the positioning information representing the geographic location of the handheld apparatus. The data reading module provides a matching condition, and the matching access module acquires a matching result according to the positioning information and the matching result. The network connection module sends the position information and the matching result to the merchandise service platform, and receives the matching result utilizing the information matching module; the matching result relates to the matching information, and is generated according to the positioning information and the matching condition. The handheld apparatus may further include a geographic database so the matching access module may access the geographic database to acquire the matching result according to the positioning information and the matching condition.

Still another object of the present disclosure is to provide a geographic merchandise matching method applicable in a handheld apparatus, the method including recognizing image information to form a matching condition; sending positioning information and the matching condition of the handheld apparatus; and receiving a matching result to the handheld apparatus. The matching result is generated according to the positioning information and the matching condition and is related to merchandise information.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
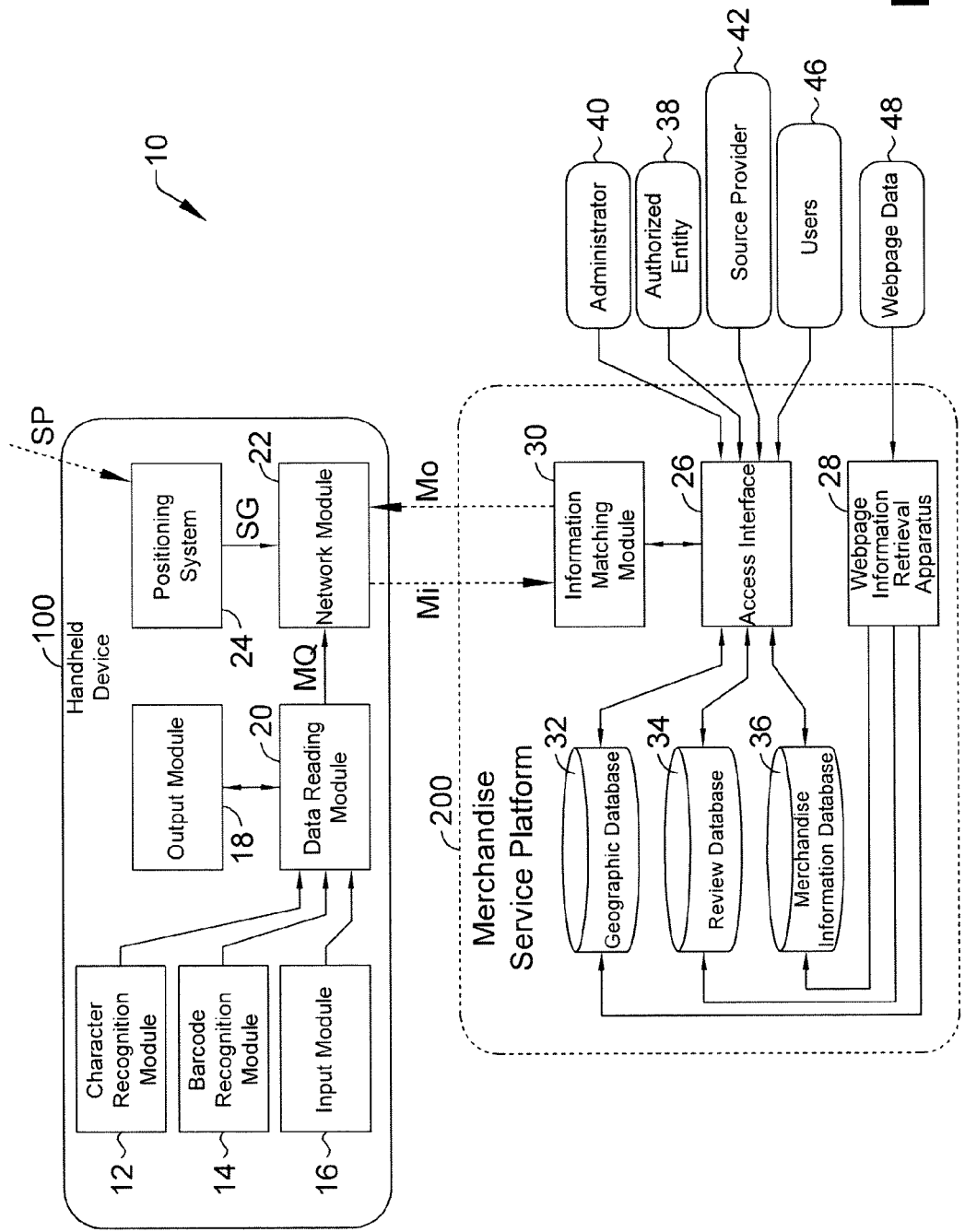
FIG. 1 depicts a geographic merchandise matching system in an embodiment of the present disclosure.

FIG. 1 illustrates a merchandise and geographic information matching system 10 of an embodiment of the present disclosure. The merchandise and geographic information matching system 10 presented here may be structured on a merchandise service platform 200, and on at least one handheld apparatus 100 illustrated in FIG. 1. The handheld apparatus 100 may be a mobile phone, a personal digital assistant, a notebook computer, a digital camera and/or a digital camcorder having a positioning system 24, an image character recognition module 12, a barcode recognition module 14, an input module 16, an output module 18, a network module 22 and a data reading module 20. The positioning module 24 receives a wireless positioning signal SP and provides corresponding positioning information SG, and this positioning information SG corresponds to the geographic location of the handheld apparatus 100. The output module 18 may comprise one or a number of displays/display panels/display lights and/or headsets/speakers, and shows the operation information and conditions of the handheld apparatus 100 to users using pictures/character images/and/or voices/sounds.

The character image recognition module 12 in the handheld apparatus 100 may recognize characters from an image, whereas the barcode recognition module 14 may recognize a barcode from an image. An optical sensor (not shown in the figure) may be set in the handheld apparatus 100 for the image character recognition module 12 and the barcode recognition module 14. And the image character module 12 then may receive the image and determine if there are any recognizable characters, digits and/or symbols in the image; if there are such characters, digits or symbols then the image character recognition module 12 may recognize it. Similarly, the barcode recognition module 14 can recognize one-dimension or two-dimension barcodes and output the characters and/or digits carried in the barcode. Furthermore, the handheld apparatus 100 may also read images from a storage media (like a memory card and or such non-volatile storage media, not shown in the figure) as the images to be analyzed by the character recognition module 12 and the barcode recognition module 14. The handheld apparatus 100 further comprises the input module 16 for receiving user inputs, wherein the input module 16 may comprise buttons, keyboard, pointing apparatus and/or trackball . . . etc. When the geographic and merchandise information matching system 10 is in operation, the data reading module 20 may integrate the character, barcode and/or user input to generate a matching requirement MQ. The network connection module 22 modulates the matching requirement MQ and the positioning information SG to a matching input Mi of the merchandise service platform 200.

In FIG. 1, the merchandise service platform 200 comprises an information matching module 30, an access interface 26, a geographic database 32, a merchandise database 36, and a rating/review database 34 in the embodiment. The information matching module 30 receives a matching input Mi sent from the handheld apparatus 100 and acquires the positioning information SG and the matching requirement MQ, and it accesses the geographic database 32, the merchandise database 36, and the rating database 34 via the access interface 26, and provides a matching result Mo according to the positioning information SG and the matching requirement MQ in the handheld apparatus 100 and then sends a matching result Mo back to the handheld apparatus 100.

The handheld apparatus 100 sends out the matching requirement MQ where the requirement may include barcode numbers, names of the store, brand names of the merchandises and/or keywords information . . . etc. At the merchandise service platform end 200, the merchandise database 36 may store a plurality of store related information and a plurality of merchandise information (not shown in the figure).

The store related information corresponds to respective stores, in which the information may include the name of the store and various information relating to the store (i.e. the store's address, its identification number and/or the store's web address) and/or the name of the store, the barcode number, the quantity of merchandise available, the pricing related information (i.e., the selling price, discount and/or promotion of each of the merchandise) and styling related information (i.e. whether the store has a complete collection of the merchandise in terms of styling and their quantities). Each merchandise information can correspond to one merchandise, including the name of the merchandise, the barcode number, manufacturer-related information (i.e. the identification number and/or the web address), the merchandise related information (i.e., the manufacturing date, expiration date and/or suggested price, and merchandise's web address . . . etc), the picture of the merchandise and/or the variations of the merchandise (i.e. the colors and sizes), etc. The geographic database 32 records a plurality of default geographic locations (not shown in the figure), and each of the default geographic locations corresponds to a store, the manufacturer's geographic location and/or the place of origin of the merchandise. The rating/review database 34 records rating/review related information for each of the merchandise, manufacturer and/or store, for example, the rating levels and/or reviews (not shown in figure), and records the source (the reviewer) and the date of each of the rated score and comment and the related information.

Figure 2:
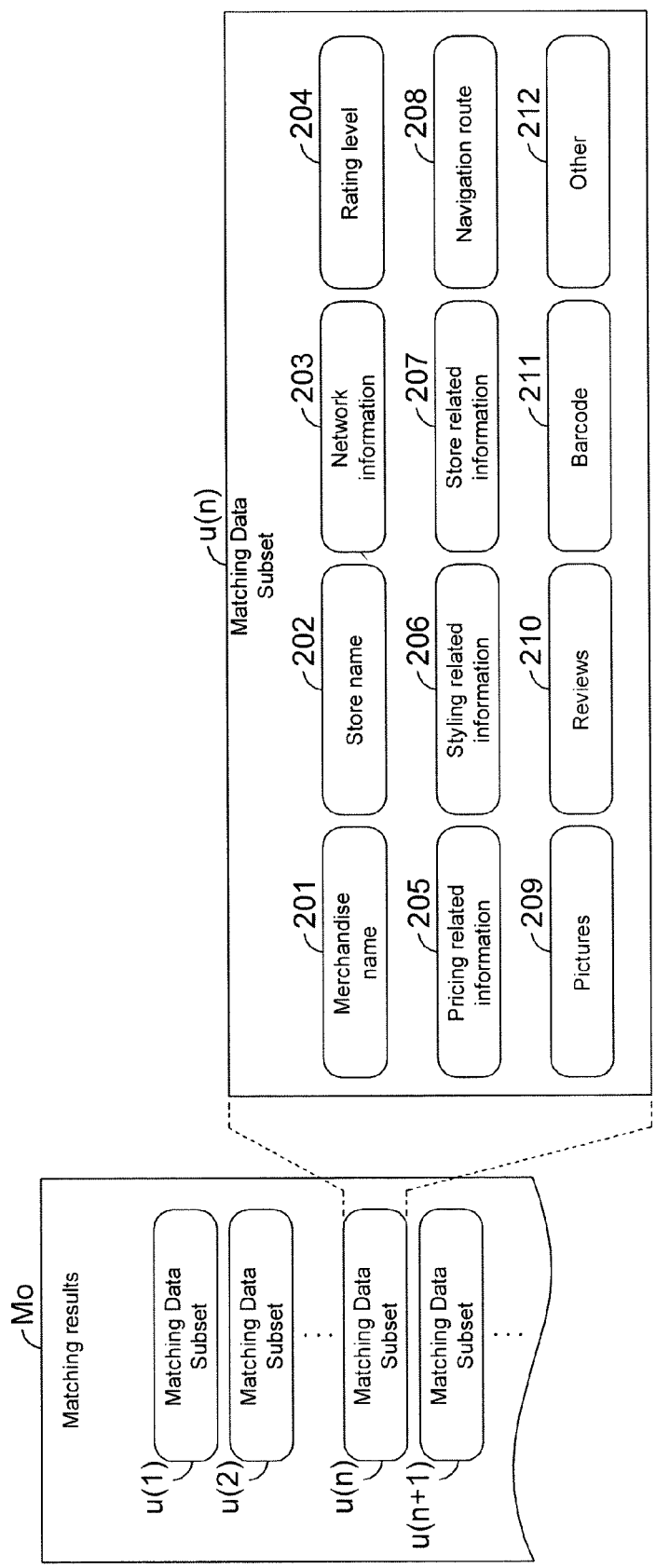
FIG. 2 depicts related information to FIG. 1.

The information matching module 30 in the merchandise matching platform 200 generates the matching result Mo, depicted in FIG. 2, by querying/indexing/searching/selecting the merchandise database 36, the geographic database 32 and/or the rating database 34 according to the positioning information SG and the matching requirement MQ in the handheld apparatus 100; the matching result Mo comprises matching data subsets represented using u(1), u(2) to u(n) and u(n+1) in FIG. 2. For example, the matching data subset u(n) in the embodiment may include the name of the merchandise 201, the name of the store 202, the network connection information 203, the rating level of the merchandise and/or the store 204 and/or reviews 210, the pricing information 205, the styling information 206, the merchandise's barcode 211, the store related information 207, the navigation route 208, and graphics about the merchandise and/or the store 209 and/or other information 212. The information matching module 30 may access the various types of information described above.

Furthermore, the information matching module 30 may decide the navigation route 208 by relating the merchandise database 36 to the geographic database 32; the navigation route may provide a route planning that sets the geographical location of the handheld apparatus 100 as the starting point and the related store locations in matching data subset u(n) as the destination/end point. In addition, the information matching module 30 may also relate the merchandise database 36 to the rating database 34 to provide rating information related to the merchandise and/or the store related to the matching data subset u(n), for example, the rating score 204 and a comment 210. The comment 210 may be in characters and/or pictures. The information matching module 30 may be related from the merchandise database 36 to the geographic database 32 and/ or the rating database 36, to provide other information 212 for the matching data subset u(n). For example, the other information 212 may be the merchandise quantity the store has in stock, the manufacture date, release date, expiration date, suggested price, available discount, gift, promotional event and/or related commercials (i.e., commercial keywords) relating to the merchandise.

When the matching data subsets u(1) to u(n+1) are included as the matching result Mo, the information matching module 30 may start evaluating a corresponding matching level for each matching data subset, then the information matching module 30 selects and sorts each matching data subset in the matching result according to its matching level. For example, the information matching module 30 may access the corresponding default geographic location (like the geographic location of the store) for the store of each matching data subset from the geographic database 32, and compute the corresponding matching level of each matching data subset according to the distance between the geographic location of the handheld apparatus 100 and the default geographic location. For example, a store (and its corresponding matching data subset) that is closer to the handheld apparatus 100 geographically should be assigned with a higher matching level so the corresponding matching data subset may be sorted closer to the top of any sorted list. Comparatively, a store that is geographically farther than a predefined distance from the handheld apparatus 100 may be eliminated and screened out from the matching results Mo. For another example, the information matching module 30 may first find the closest public transportation route relative to the handheld apparatus 100 and then further evaluate the matching level by comparing the store corresponding to certain matching data subsets with each stop in that transportation route, and the store that is the closest to a given certain stop in the route may be assigned the highest matching level. Besides the geographical distance, the information matching module 30 may also integrate the related pricing information 205 (the selling price of the merchandise), the rating/reviews of the merchandise/store 204, and the relevance of the matching requirement of the store/merchandise to calculate the matching level.

Figure 3:
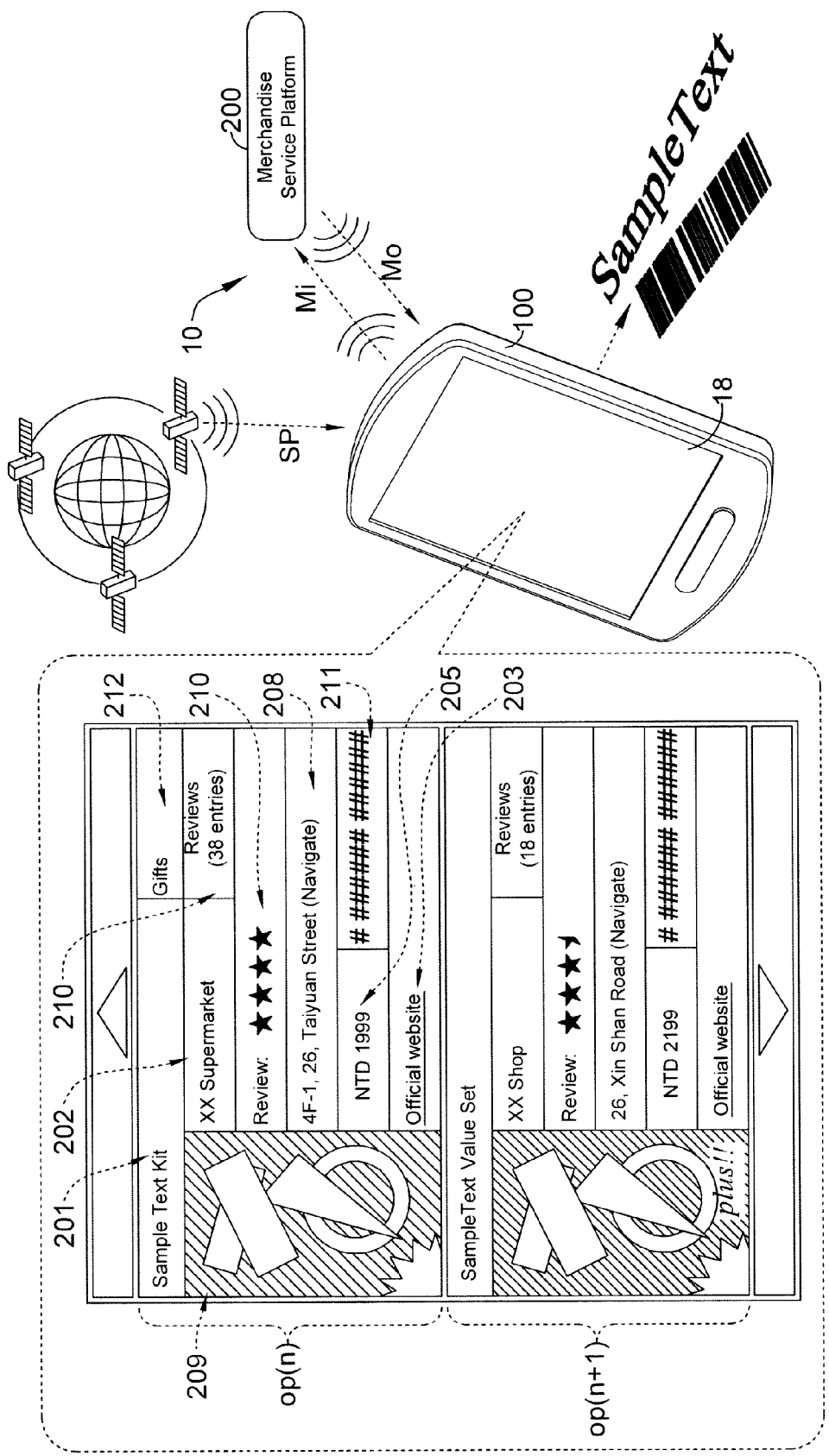
FIG. 3 depicts an applicable embodiment of the geographic merchandise matching system in FIG. 1.

In the embodiment depicted in FIG. 3, the output module of the handheld apparatus 100 (which may comprise a display panel) may display matching data subsets u(n), u(n+1) in the matching result Mo (in FIG. 2) as the corresponding output units op(n), op(n+1) such that the information in the corresponding matching data subset can be displayed clearly, and be easily read from the output unit. For example, as illustrated in the FIG. 3, the output unit op(n) may show picture 209, and display the name of the store 201, name of the merchandise 202, the pricing related information 205, the merchandise's barcode number 211 and other information 212, and use simple and clear symbols to display the rating 204. The comment 210, the positioning route 208 and the network connection information 303 then may be displayed as hyperlinks so users may click the link to retrieve more information form the web.

Besides optically retrieving images to recognize the merchandise related information and to form the matching requirement using the handheld apparatus 100, the handheld apparatus 100 may also utilize other sources to retrieve and recognize the image. For example, the handheld apparatus 100 may receive an image via the network connection module 22 utilizing its communication feature, like the images sent from other users using other handheld apparatus, to form the matching result by recognizing the image. Through the operation of the geographic and merchandise information matching system 10 of the present disclosure, users are not only provided with a user-friendly and intuitive geographic merchandise matching service that satisfies his/her instant need of geographic information but it has also provided a value-added application for the handheld apparatus.

Reference is again made to FIG. 1. In the merchandise service platform 200 of the present disclosure, besides the users of the handheld apparatus 100, under an appropriate access control, the access interface 26 may also make access to the data in the geographic database 32, the rating database 34, and the merchandise information database 36 available to the service provider 40 (the service provider of the geographic and merchandise information matching system 10, for example) to access, update, maintain and/or search the geographic database 32, rating database 34, and merchandise information database 36. For example, under the access control, the network user 46 may write into the rating database 34, and may only read, browse, search but may not modify the contents in the geographic database 32 and the merchandise information database 36. The administrator 38 (for example, each owner of the store and/or the manufacturer of the merchandise) then may update some of the data in the merchandise information database 36, and may read from the rating database 34, but may not modify it.

In addition, the merchandise service platform 200 of the present disclosure may set a webpage information retrieval apparatus 28, the apparatus may automatically access and retrieve related webpage data 48 of the merchandise on the internet, and update the rating database 34, the merchandise information 36 and/or the geographic database 32. For example, this webpage information retrieval apparatus 28 may be realized as a web crawler, a web spider, a web robot or similar auto-indexing mechanisms used in the web search engines.

The merchandise service platform 200 may also set a user database (not shown in the figure) in each of the handheld apparatus, to record the user preference, condition of use and/or history record of usage of each handheld apparatus. For example, the user database in the handheld apparatus 100 may be used to record the geographic location and the matching requirements MQ that a user ever used to provide a more customized geographic and merchandise information matching service. For another example, the user may also record some of the matching requirements MQ as a frequently used matching requirement, and record some of the geographic locations as frequently used geographic locations; when the handheld apparatus 100 is around the frequently used geographic location, the system or the handheld apparatus 100 may automatically trigger the merchandise service platform 200 for matching the frequently used matching requirements. Or, the user of the handheld apparatus 100 may also manually enter a corresponding matching result Mo of a geographic location to the user database; when the handheld apparatus 100 is again approaching the manually entered geographic location, the handheld apparatus 100 then may automatically show the previous matching result Mo to the users.

Figure 4:
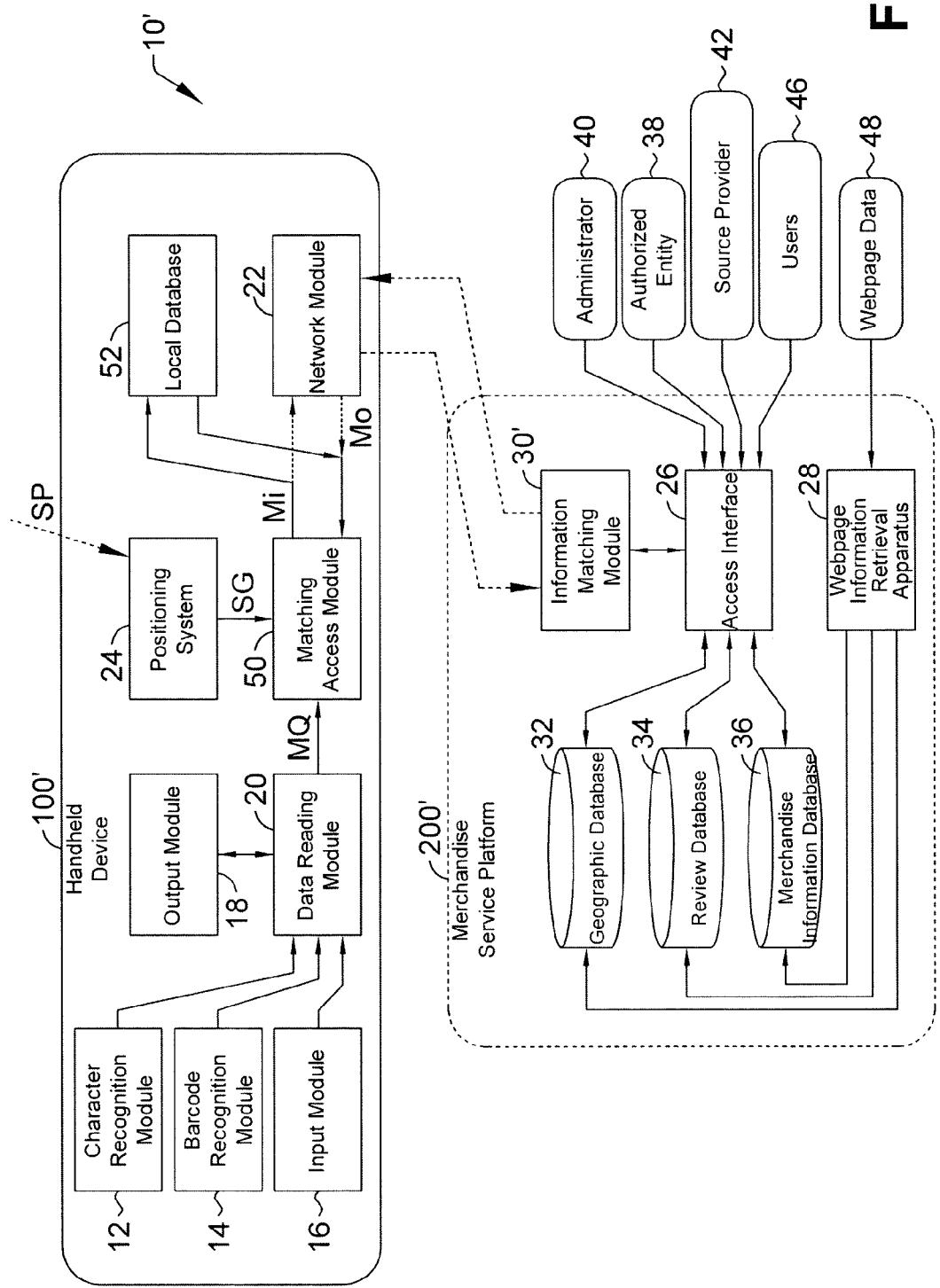
FIG. 4 depicts another embodiment of the geographic merchandise matching system in the present disclosure.

FIG. 4 illustrates the geographic and merchandise information matching system of another embodiment 10' of the present disclosure; the geographic and merchandise information matching system is structured on a merchandise service platform 200' with a handheld apparatus 100' in FIG. 4. Similar to the handheld apparatus 100 in the FIG. 1, the handheld apparatus 100' comprises a positioning system 24, an image character recognition module 12, a barcode recognition module 14, an input module 16, an output module 18, a network connection module 22 and a data reading module 20. The handheld apparatus 100' further comprises a matching access module 50 and a local database 52. The data reading module 20 may integrate the image character recognition module 12, the barcode recognition module 14 and/or the characters/barcodes and/or the user inputs in the input module 16 to provide a matching requirement MQ, and the positioning system 24 receives a wireless positioning signal SP to provide a corresponding positioning information SG.

In the embodiment of FIG. 4, the local database 52 in the handheld apparatus 100' may be realized using a non-volatile memory that may cover the geographic database 32, the merchandise database 36 and the rating database 34 in the FIG. 1. The matching access module 50 in the handheld apparatus 100' may access, search, and index the local database 52 according to the matching input Mi. The matching input Mi is integrated from the matching requirement MQ and the positioning information SG. Then, the handheld apparatus 100' may show the matching result Mo to the users via the output module 18. In other words, the handheld apparatus 100' may complete a geographic matching service via the local database 52 in this embodiment.

On the other hand, the handheld apparatus 100' may also set the network connection module 22 to exchange data with the merchandise service platform 200'. Similar to the merchandise service platform 200 in the FIG. 1, the merchandise service platform 200' of the present embodiment also comprises the information matching module 30', the access interface 26, the geographic database 32, the merchandise database 36 and the rating database 34. Besides completing the geographic and merchandise information matching service using the local database 52 in the handheld apparatus 100', the handheld apparatus 100' may also send the matching input Mi via the network connection module 22 to the information matching module 30', and generate a matching result Mo by accessing the geographic database 32, the rating database 34, and the merchandise database 36 from the information matching module 30', and then send the matching result Mo back to network connection module 22 in the handheld apparatus 100.

Furthermore, the handheld apparatus 100' may also update the local database 52 utilizing its communication feature via the network connection module 22 and the information matching module 30'. For example, the handheld apparatus 100' may periodically connect with information module 30' via the network connection module 22, and if the geographic database 32, the merchandise database 36 and/or the rating database 34 in merchandise service platform 200' already have the updated data, then the information matching module 30' may send the updated data to the handheld apparatus 100' and add the newly added data into the local database 52 in the handheld apparatus 100'; the matching access module 50 in the handheld apparatus 100' then may appropriately delete the outdated data in the geographic database 52, and regularly send these information to the merchandise service platform 200' to the user database (not shown in the figure) updated.

In another embodiment of the present disclosure, the local database 52 does not cover all the data in the geographic database 32, the rating database 34 and/or the merchandise database 36. For instance, suppose that a user of the handheld apparatus 100' is active only in a particular region, then the local geographic database 52 needs only to cover the data related to that particular region for providing the user the geographic merchandise matching service; when the location of the handheld apparatus 100' is beyond that particular region, the handheld apparatus 100' may request the merchandise service platform 200' to provide the merchandise matching service rather than using the local database 52, or, request the merchandise matching service platform 200' to update the local database 52 in the handheld apparatus 100'.

Figure 5:
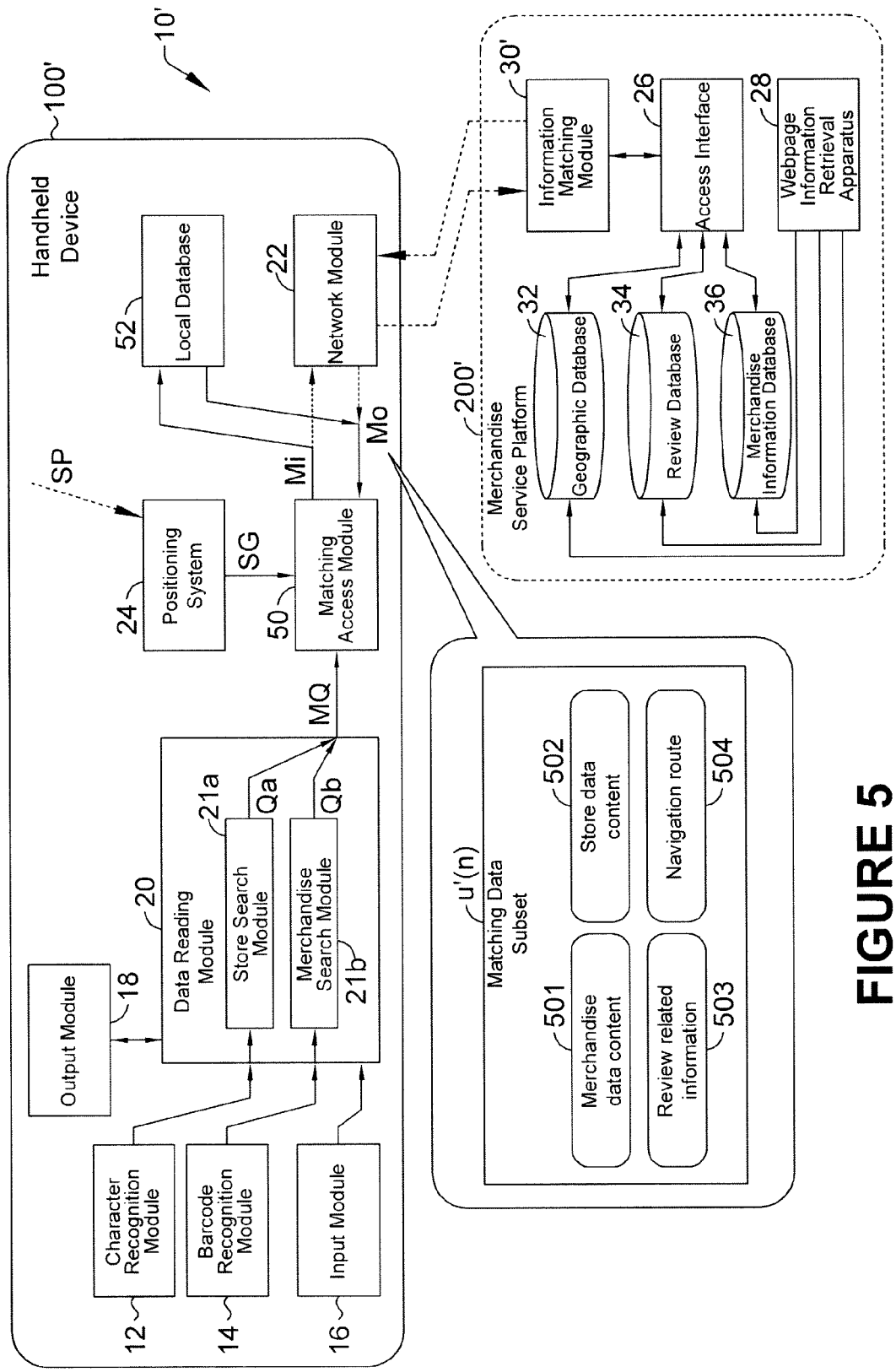
FIG. 5 depicts another embodiment of the geographic merchandise matching system in the present disclosure.

In the embodiments of FIG. 1 and FIG. 4, the handheld apparatus 100 and 100' both comprise the image character recognition module 12 and the barcode recognition module 14. The handheld apparatus in the present disclosure may also automatically generate the corresponding recognition condition according to the image character recognition result and the barcode result, separately, as depicted in the FIG. 5. FIG. 5 includes the handheld apparatus 100' as an example for illustration; the handheld apparatus 100 in FIG. 1 can also be used in the embodiment. A store search module 21a and a merchandise search module 21b may be realized in the data reading module 20 in the handheld apparatus 100' of FIG. 5. The store search module 21a utilizes the recognition result of the image character recognition module 12 as the keywords of the name of the store to form a corresponding matching requirement Qa to be the matching requirement MQ, and starts the corresponding search and matching. In other words, the auto-indexing of the characters of the store-related characters may start after the characters are recognized using the image character recognition feature in the handheld apparatus 100', after the characters are retrieved from an advertisement and/or a marking.

Similarly, the store search module 21b forms a corresponding matching requirement Qb according to the digits and/or characters recognized by the barcode recognition module 12. In other words, the user may retrieve the one-dimensional and/or the two-dimensional barcode of the merchandise using the handheld apparatus 100'; and the auto-indexing of the related digits and/or characters of the related merchandise may start after the digits and/or the characters of the barcode are recognized utilizing the barcode recognition feature of the handheld apparatus 100'.

The matching result Mo may be acquired after searching, indexing, and merchandise matching of the local geographical database base on the matching condition Qa and/or Qb. The matching result Mo may have one or more matching data subsets, where FIG. 5 illustrates an embodiment of a matching data subset u'(n). The matching data subset u'(n) may also comprise the merchandise data content 501, the store data content 502, and the rating related information 503 and/or positioning path 504. The store data content 501 may comprise the name of the merchandise, the network connection information (i.e., the website of the merchandise . . . etc.), the pricing related information (i.e., the suggested selling price), the styling related information, the merchandise's barcode, date of selling, date of manufacturing, warranty period, and/or the expiration date and/or the picture of the merchandise. The store data content 502 may also include the name of the store, the network connection information (i.e., the store's website), the pricing related information (i.e. the actual selling price of a particular merchandise and/or its discounts and/or any promotion availability), the styling related information (i.e., the quantities of in-stock merchandises of different styles) and/or the store related information (i.e., the picture of a store, and other branches, their identification number and/or addresses) . . . etc. The rating related information 503 may be the actual rating and/or comments of the merchandises and/or the stores. The navigation path 504 may be a geographic path navigated from the handheld apparatus 100' to the location of the store, or to the merchandise's place of origin, the maintenance stops, and/or the manufacturer. Similar to the related discussion in FIG. 2, different matching data subsets of the matching result Mo may also be sorted according to the matching level.

In the embodiment of FIG. 1, FIG. 4 and FIG. 5, the features of image character recognition module 12 and the barcode recognition module 14 may be realized using software executables and/or recognition code of firmware of a processor (not shown in the figure) in the handheld apparatus 100 (and 100'). The communication feature between the network module 22 and the merchandise service platform 200 (200') may be realized following the wireless communication specification for data transmission and receiving, for example, the Global System for Mobile communications (GSM) and/or the mobile wireless communication specification like the 3G wireless communication technology. The information matching module 30' of the merchandise service platform 200/200' may be realized by executing appropriate management programs, and the geographic database 32, the rating database 34 and the merchandise database 36 may be realized using non-volatile memory apparatus, i.e., hard disks, optical discs and/or magnetic tape . . . etc.

In summary, the present disclosure provides a user friendly, intuitive and convenient geographic merchandise matching service that combines both user's geographic location and their instant needs, and thus creates a value-added application for handheld apparatuses/positioning system.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structure.

What is claimed is:

1. A merchandise and geographic information matching system, comprising:
   a handheld apparatus, comprising:
      a positioning system, for receiving a wireless positioning signal and providing corresponding positioning information which represents a geographic location of the handheld apparatus; and
      a network module, for transmitting the positioning information and a matching requirement, wherein the matching requirement is generated on the handheld apparatus and is based on information received from another handheld apparatus; and
   an information matching module comprising a processor and associated memory storing instructions that when executed by the processor cause the information matching module to receive the positioning information and the matching requirement to provide a matching result accordingly, and to transmit the matching result to the handheld apparatus, wherein the matching result is related to merchandise information,
   wherein the matching result is based on a closest public transportation route to the handheld apparatus, including given stops on said closest public transportation route.

2. The merchandise and geographic information matching system according to claim 1, wherein the matching requirement comprises at least one of a merchandise barcode, a name of a merchandise, a name of a store or a keyword.

3. The merchandise and geographic information matching system according to claim 1, wherein the matching result comprises at least a matching data subset comprising at least one of a name of a merchandise corresponding to merchandise, network link information providing a website address, review related information, pricing related information, styling related information, store related information corresponding to a store, a navigation route for providing route planning with the geographic location of the handheld apparatus as a starting point and a geographic location of the store as an end point, a picture displaying the merchandise; or a merchandise barcode corresponding to the merchandise.

4. The merchandise and geographic information matching system according to claim 3, wherein each matching data subset corresponds to a matching level, and the information matching module sorts the matching data subsets in the matching result according to the matching levels of the matching data subsets.

5. The merchandise and geographic information matching system according to claim 4, further comprising:
an access interface and a geographic database, the information matching module accessing the geographic database via the access interface, wherein the geographic database records a plurality of default geographic locations corresponding to different stores respectively.

6. The merchandise and geographic information matching system according to claim 5, wherein the information matching module accesses one of the default geographic locations from the geographic database according to the store or the merchandise recorded in one of the matching data subsets, and generates the matching level corresponding to the matching data subset according to a geographic distance between the default geographic location and the geographic location of the handheld apparatus.

7. The merchandise and geographic information matching system according to claim 6 further comprising:
a merchandise database and a review database, wherein the information matching module accesses the merchandise database and the review database via the access interface to create the matching data subsets and to evaluate the matching levels of the matching data subsets.

8. The merchandise and geographic information matching system according to claim 1, wherein the handheld apparatus further comprises:
a data reading module, for providing the matching requirement.

9. The merchandise and geographic information matching system according to claim 8, wherein the handheld apparatus further comprises:
an character recognition module, for recognizing a character from an image, wherein the data reading module provides the matching requirement according to the character which is recognized.

10. The merchandise and geographic information matching system according to claim 8, wherein the handheld apparatus further comprises:
a barcode recognition module, for recognizing a barcode from an image, and the data reading module provides the matching requirement according to the barcode.

11. The merchandise and geographic information matching system according to claim 8, wherein the handheld apparatus further comprises:
an input module, for receiving user input, and the data reading module provides the matching requirement according to the user input.

12. A handheld apparatus comprising:
a processor and associated memory storing instructions that when executed by the processor cause:
a positioning system to receive a wireless positioning signal and provide corresponding positioning information, where the positioning information represents a geographic location of a handheld apparatus;
a recognition module to recognize an image information to generate a matching requirement, wherein the matching requirement is generated on the handheld apparatus and is based on information received from another handheld apparatus; and
a network module to transmit the positioning information and the matching requirement;
wherein the network module further receives a matching result generated according to the positioning information and the matching requirement, and the matching result is related to merchandise information, and
wherein the matching result is based on a closest public transportation route to the handheld apparatus, including given stops on said closest public transportation route.

13. The handheld apparatus according to claim 12 further comprising a matching access module and a local database, and the matching access module accesses the local database to acquire the matching result according the positioning information and the matching requirement.

14. A merchandise and geographic information matching method applied in a handheld apparatus, the method comprising:
recognizing image information to form a matching requirement, wherein the matching requirement is generated on the handheld apparatus and is based on information received from another handheld apparatus;
transmitting positioning information and the matching requirement; and
receiving a matching result;
wherein the matching result is generated according to the positioning information and the matching requirement and the matching result is related to merchandise information and
wherein the matching result is based on a closest public transportation route to the handheld apparatus, including given stops on said closest public transportation route.

15. The merchandise and geographic information matching method according to claim 14, wherein the matching result comprises a plurality of matching data subsets, each matching data subset, having store related information or merchandise related information, corresponding to a matching level, the method further comprises:
sorting the matching data subsets according to the matching levels in the matching result.

16. The merchandise and geographic information matching method according to claim 15 further comprising:
accessing a geographic database that records a plurality of default geographic locations corresponding to different stores.

17. The merchandise and geographic information matching method according to claim 16, wherein the accessing of the geographic database comprises accessing one of the default geographic location of the store or the merchandise that corresponds to each of the geographic locations according to the store or the merchandise corresponding to each matching data subset; and the method further comprises:
generating each matching level of each matching data subset by calculating the geographic distance between geographic location of the handheld apparatus and the default geographic location.

18. The merchandise and geographic information matching method according to claim 17 further comprising:
accessing a merchandise database and a review database to create the matching data subsets, and evaluating the matching levels of the matching data subsets.

19. The merchandise and geographic information matching method according to claim 14, wherein recognizing the image information comprises recognizing a barcode from the image information.

20. The merchandise and geographic information matching method according to claim 14, wherein recognizing the image information comprises recognizing a character in the image information.

* * * * *